United States Patent
Konopka

(10) Patent No.: US 6,720,739 B2
(45) Date of Patent: Apr. 13, 2004

(54) BALLAST WITH PROTECTION CIRCUIT FOR QUICKLY RESPONDING TO ELECTRICAL DISTURBANCES

(75) Inventor: John G. Konopka, Deer Park, IL (US)

(73) Assignee: Osram Sylvania, Inc., Danvers, MA (US)

( * ) Notice: Subject to any disclaimer, the term of this patent is extended or adjusted under 35 U.S.C. 154(b) by 0 days.

(21) Appl. No.: 09/953,593

(22) Filed: Sep. 17, 2001

(65) Prior Publication Data

US 2003/0052621 A1 Mar. 20, 2003

(51) Int. Cl.⁷ .............................. H05B 41/14; G05F 1/00
(52) U.S. Cl. ...................................... 315/225; 315/308
(58) Field of Search ................................. 315/225, 119, 315/227, 307, 308, 291, 127, 293, 219, 209 R, DIG. 5, DIG. 7

(56) References Cited

U.S. PATENT DOCUMENTS

| | | | |
|---|---|---|---|
| 4,488,199 A | 12/1984 | Bloomer | 361/93 |
| 5,619,105 A | 4/1997 | Holmquest | 315/25 |
| 5,751,115 A * | 5/1998 | Jayaraman et al. | 315/225 |
| 5,770,925 A * | 6/1998 | Konopka et al. | 315/225 |
| 5,872,429 A * | 2/1999 | Xia et al. | 315/194 |
| 5,883,473 A * | 3/1999 | Li et al. | 315/225 |
| 5,945,788 A * | 8/1999 | Li et al. | 315/308 |
| 6,037,722 A * | 3/2000 | Moisin | 315/307 |
| 6,400,095 B1 * | 6/2002 | Primisser et al. | 315/224 |

* cited by examiner

Primary Examiner—James Clinger
Assistant Examiner—Chuc Tran
(74) Attorney, Agent, or Firm—Kenneth D. Labudda

(57) ABSTRACT

A ballast (10,20) for powering a gas discharge lamp load (30) comprises a protection circuit (300,600) operable to monitor an electrical signal (40) in the ballast and disable the ballast for at least a predetermined period of time in response to a disturbance wherein at least a portion (44) of the electrical signal (40) exhibits a time-rate-of-change that exceeds the time-rate-of-change of the signal during normal operation of the ballast and gas discharge lamp load. Protection circuit (300,600) is capable of disabling the ballast within a response time that is less than twice the period of the electrical signal. In a preferred embodiment that is suitable for ballasts with driven-type inverters, protection circuit (300) comprises a latching device (310) and a triggering circuit (330). In a preferred embodiment that is suitable for ballasts with self-oscillating type inverters, protection circuit (600) comprises a pull-down circuit (640) and a negative voltage source (610).

29 Claims, 6 Drawing Sheets

US 6,720,739 B2

BALLAST WITH PROTECTION CIRCUIT FOR QUICKLY RESPONDING TO ELECTRICAL DISTURBANCES

FIELD OF THE INVENTION

The present invention relates to the general subject of circuits for powering discharge lamps. More particularly, the present invention relates to a ballast that includes a circuit for detecting and responding to electrical disturbances such as output arcing.

BACKGROUND OF THE INVENTION

Ballasts for gas discharge lamps provide high ignition voltages for starting the lamps. The ignition voltages supplied by preheat type ballasts are typically on the order of several hundred volts (e.g., 500 volts peak), while those provided by instant-start type ballasts may exceed 1000 volts peak. As a consequence of these high output voltages, ballasts are subject to the problem of output arcing.

Output arcing may occur in any of a number of different ways. For example, in fluorescent lighting installations, it is a common practice to replace failed lamps while AC power is applied to the ballast. This practice is referred to as "live" relamping. During live relamping, as a lamp is being removed or inserted, a momentary arc may form between the fixture socket contacts and a pin of the lamp. As another example, a sustained arc (as opposed to a momentary arc) arc may occur due to poor connections in the output wiring or the lamp sockets, or if a lamp is improperly installed such that a small gap exists between the lamp pins and the contacts within the fixture sockets.

Arcing is generally acknowledged to cause degradation of the contacts in the fixture sockets and undue stress on components within the ballast. Sustained arcing is especially undesirable. In order to minimize any ill effects due to arcing, it is important that the arc be promptly extinguished. Thus, a need exists for a ballast having a protection circuit that quickly detects an output arc and then takes appropriate action to quickly extinguish the arc. A further need exists for a protection circuit that is economical and easy to implement within existing ballasts. Such a ballast and protection circuit would represent a considerable advance over the prior art.

DETAILED DESCRIPTION OF THE PREFERRED EMBODIMENTS

Figure 1:
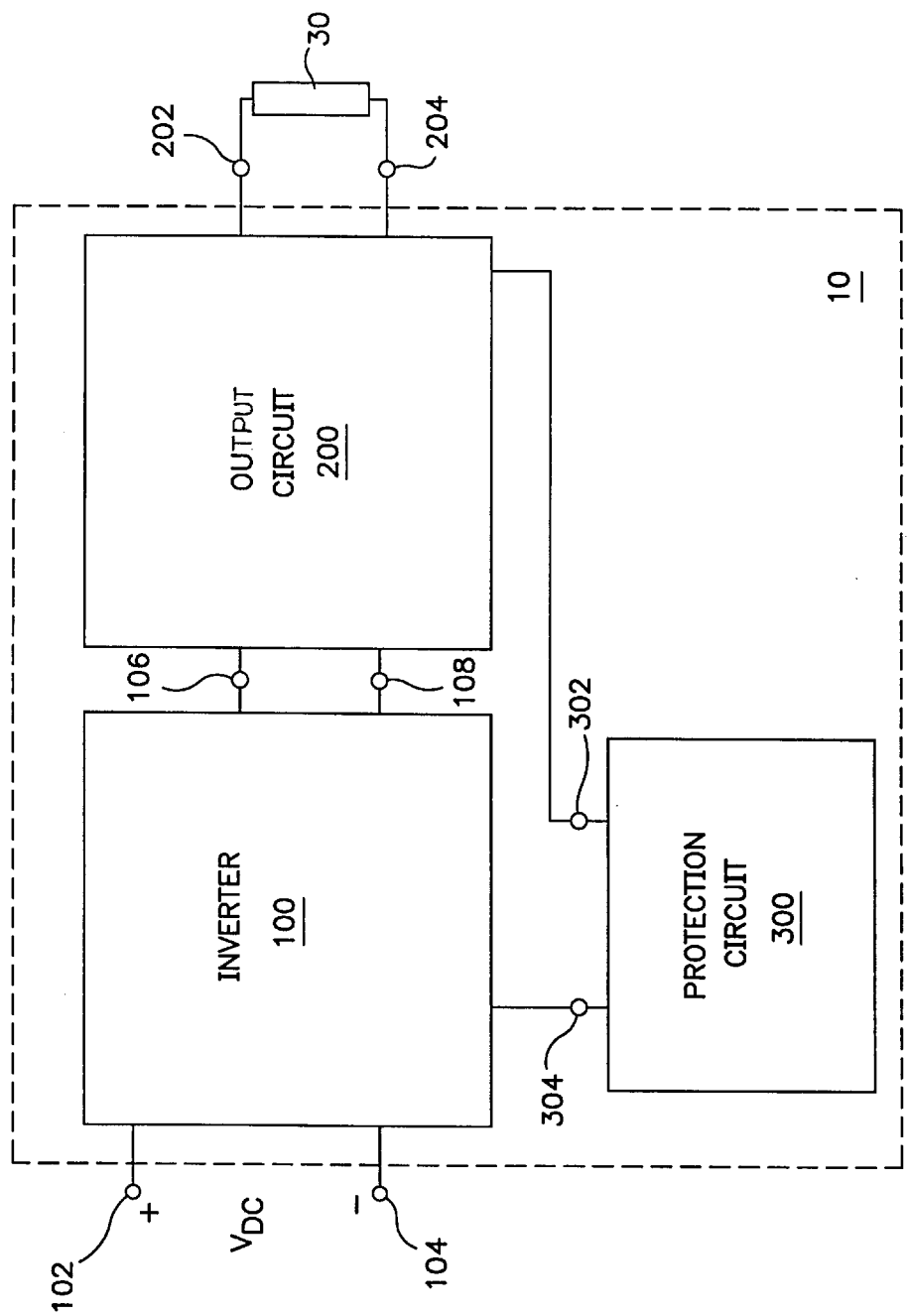
FIG. 1 is a block diagram schematic of a ballast with a protection circuit, in accordance with first and second preferred embodiments of the present invention.

FIG. 1 describes a ballast 10 for powering a gas discharge lamp load 30. Ballast 10 includes an inverter 100, an output circuit 200, and a protection circuit 300. During operation, inverter 100 provides a high frequency (e.g., 20 kilohertz or greater) voltage at an inverter output 106,108. Output circuit 200 is coupled to inverter output 106,108, and includes output connections 202,204 for connection to gas discharge lamp load 30. Protection circuit 300 is coupled to inverter 100 and output circuit 200. During operation, protection circuit 300 monitors a signal within output circuit 200. In response to a disturbance wherein at least a portion of the signal exhibits a time-rate-of-change that substantially exceeds the time-rate-of-change of the signal during normal operation of the ballast and gas discharge lamp load, protection circuit 300 disables inverter 100 for at least a predetermined period of time (e.g., 100 milliseconds).

Figure 2:
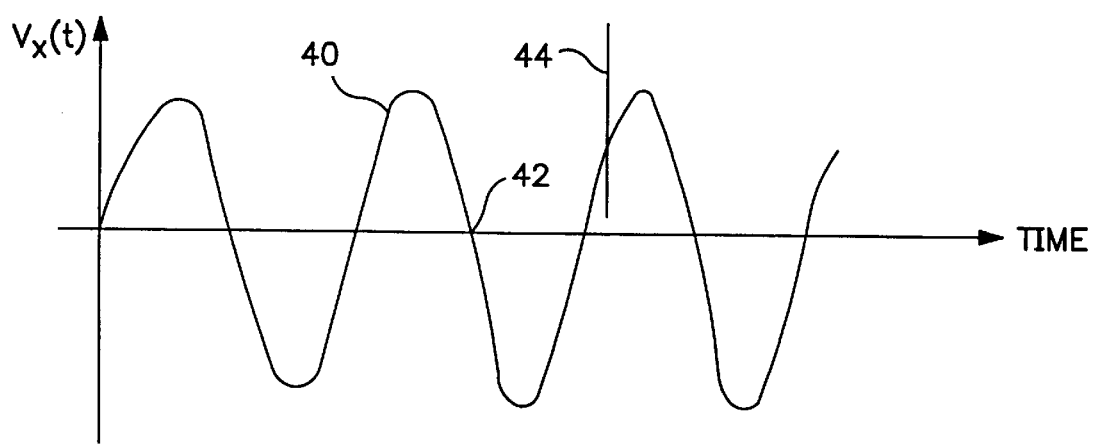
FIG. 2 describes an example of an electrical disturbance to which the disclosed protection circuit is responsive, in accordance with the preferred embodiments of the present invention.

Typical disturbances to which protection circuit 300 is responsive include disconnection of a lamp from the ballast and occurrence of an arcing condition at the ballast output connections 202,204. For example, as illustrated in FIG. 2, such disturbances generally cause at least one transient spike 44 having a relatively large time-rate-of-change to appear in the monitored signal 40. It should of course be appreciated that the waveform in FIG. 2 is a gross simplification of what occurs in reality; most disturbances, such as output arcing, will cause multiple transient spikes to appear in the monitored signal. When lamp load 30 is operating in a normal manner, the monitored signal will be a periodic signal having a period. For example, as illustrated in FIG. 2, the monitored signal may be a substantially sinusoidal signal. During normal operation of the ballast and lamp load, the maximum time-rate-of-change of a sinusoidal signal occurs at the zero crossings 42, and is substantially less than the maximum time-rate-of-change of transient 44.

Advantageously, following a disturbance in the signal within output circuit 200, protection circuit 300 is capable of disabling inverter 100 within a response time that is less than twice the period of the high frequency voltage at the inverter output. For typical ballast applications, where the frequency of the voltage at the inverter output is designed to be 20 kilohertz or greater, this corresponds to a response time that is less than 100 microseconds.

Preferably, inverter 100 and protection circuit 300 are further operable such that inverter 100 is re-enabled after the predetermined period of time (e.g., 100 milliseconds) elapses. This feature is desirable in order to prevent permanent shutdown of the ballast (i.e., necessitating that power to the ballast be cycled off and on in order to reset the ballast) in the event of false detection due to a momentary power line transient or any of a number of anomalous phenomena that pose no sustained threat to ballast reliability or safety.

Figure 3:
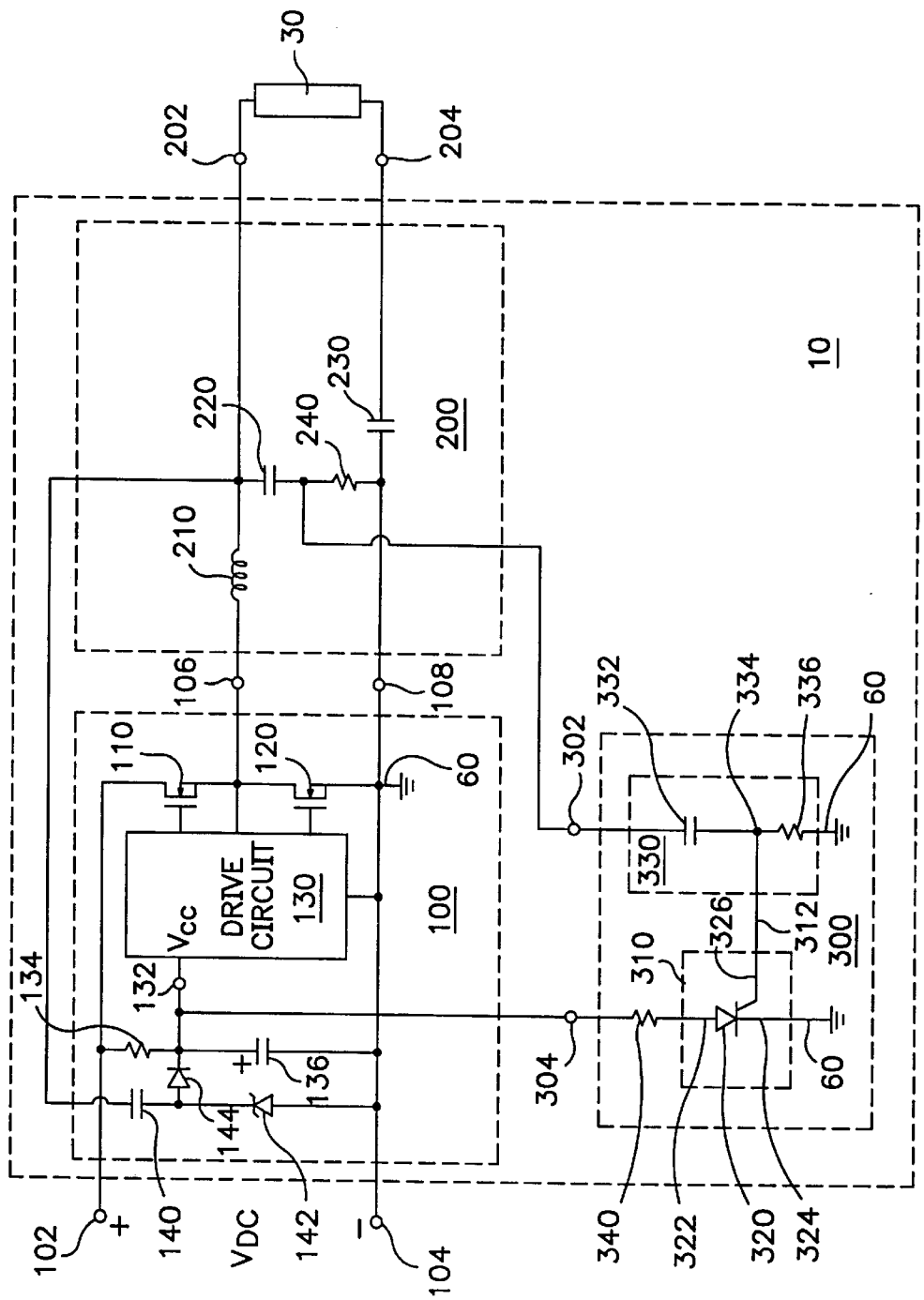
FIG. 3 is a schematic diagram of a ballast with a driven inverter and a series resonant output circuit, wherein a disturbance is monitored in the resonant circuit, in accordance with the first preferred embodiment of the present invention.

Turning now to FIG. 3, in a first preferred embodiment of the present invention, inverter 100 comprises first and second input terminals 102,104, first and second output terminals 106,108, a pair of inverter switches 110,120, an inverter drive circuit 130, and a DC supply circuit that includes resistor 134, capacitor 136, capacitor 140, zener diode 142, and diode 144. Second output terminal 108 is coupled to a circuit ground node 60.

During operation, inverter 100 receives a substantially direct current (DC) voltage, $V_{DC}$, at inverter input terminals 102,104 and provides a high frequency squarewave voltage between output terminals 106,108. $V_{DC}$ can be provided by any of a number of known arrangements that accept an ordinary AC power-line voltage (e.g., 120 VAC, 277 VAC) and provide a filtered DC output voltage. For example, $V_{DC}$ can be provided by a full-wave rectifier followed by a boost converter.

Drive circuit 130 is coupled to inverter switches 110,120, and has a supply input 132 for receiving a DC supply voltage. During operation, as long as the DC supply voltage is greater than a predetermined value, drive circuit 130 turns inverter switches 110,120 on and off in a substantially complementary manner and at a high frequency rate that is preferably in excess of 20 kilohertz. If the DC supply voltage falls below a predetermined value, drive circuit 130 ceases switching of inverter switches 110,120. Drive circuit 130 may be implemented using a custom integrated circuit (IC) or any of a number of commercially available integrated circuits, such as the IR2155 "high-side driver" integrated circuit manufactured by International Rectifier.

Resistor 134 functions as a startup resistor that, following application of power to ballast 10, supplies current for initially charging capacitor 136 to a voltage sufficient to activate driver circuit 130 and initiate inverter switching. Once inverter 100 begins to operate, capacitor 140 and diode 144 function as a bootstrap supply that uses energy in output circuit 200 to maintain the voltage across capacitor 136 at a level sufficient to keep driver circuit 130 on. Zener diode 142 serves as a protective device that prevents the voltage at supply input 132 from rising, under certain circumstances, to levels that might be harmful to drive circuit 130.

Protection circuit 300 has an input 302 and an output 304. Input 302 is coupled to output circuit 200. Output 304 is coupled to inverter 100. During operation, protection circuit 300 monitors a signal within output circuit 200 and, in response to occurrence of a disturbance in the signal, disables inverter 100 for a limited period of time. A disturbance is deemed to have occurred when at least a portion of the signal has a time-rate-of-change that substantially exceeds the time-rate-of-change of the signal during normal operation of the ballast and lamp load.

Referring again to FIG. 3, in a first preferred embodiment of the present invention, output circuit 200 comprises first and second output connections 202,204, a resonant inductor 210, a resonant capacitor 220, a direct current (DC) blocking capacitor 230, and a current-sensing resistor 240. Output connections 202,204 are adapted for connection to a lamp load 30 comprising at least one gas discharge lamp 32. Resonant inductor 210 is coupled between first output terminal 102 and first output connection 202. Resonant capacitor 220 is coupled between first output connection 220 and circuit ground node 60. DC blocking capacitor 230 is coupled between second output connection 204 and circuit ground node 60. Current-sensing resistor 240 interposed between resonant capacitor 220 and circuit ground node 60. Input 302 of protection circuit 300 is coupled to current-sensing resistor 240. In this configuration, the signal monitored by protection circuit 300 is the current that flows through resonant capacitor 220.

Output 304 of protection circuit 300 is coupled to the supply input 132 of drive circuit 130. During operation, and in response to a disturbance, protection circuit 300 turns off drive circuit 130 by coupling supply input 132 to circuit ground 60 for a predetermined period of time. Once supply input 132 is coupled to ground, the voltage at supply input 132 will quickly fall below the predetermined value necessary to keep drive circuit 130 active, so drive circuit 130 will turn off and inverter switching will cease. As long as supply input 132 is coupled to ground, the supply voltage will be prevented from reaching a value necessary to reactivate drive circuit 130.

Upon expiration of the predetermined period of time (e.g., 100 milliseconds), protection circuit 300 will cease coupling supply input 132 to ground, at which point capacitor 136 will begin to charge up via startup resistor 134. Once the voltage across capacitor 136 reaches a predetermined startup threshold (the exact value of which is determined by the actual device used to implement drive circuit 130), drive circuit 130 will turn on and begin to switch the inverter switches on and off. With the inverter now operating again, energy sufficient to maintain the supply voltage above the turn-off threshold is supplied by the bootstrapping circuit consisting essentially of capacitor 140 and diode 144. In this way, protection circuit 300 allows inverter 100 to automatically restart.

A preferred circuit implementation of protection circuit 300 is now explained with reference to FIG. 3 as follows. Protection circuit 300 includes a latching device 310 and a triggering circuit 330. Latching device 310 is coupled between output 304 and circuit ground 60, and has a control terminal 312 coupled to a first node 334. During operation, latching device 310 is functional to: (1) turn on and couple output 304 to circuit ground in response to the voltage at control terminal 312 reaching a predetermined triggering voltage (e.g., 1 volt); and (2) remain on for as long as the amount of current flowing through the device (i.e., from protection circuit output 304 to circuit ground 60) exceeds a predetermined holding current (e.g., 10 milliamperes); the predetermined holding current is dictated by the electrical characteristics of the component(s) used to implement latching device 310. Triggering circuit 330 is coupled to input 302, first node 334, and circuit ground 60. During operation, triggering circuit 330 is functional, in response to a disturbance, to provide sufficient voltage (e.g., 1 volt) to turn on latching device 310.

Preferably, latching device 310 is implemented using a silicon controlled rectifier (SCR) 320. SCR 320 has an anode 322 coupled to protection circuit output 304, a cathode 324 coupled to circuit ground 60, and a gate terminal 326 coupled to first node 334.

As described in FIG. 3, triggering circuit 330 preferably includes a capacitor 332 and a resistor 336. Capacitor 332 is coupled between protection circuit input 302 and first node 334 Resistor 336 is coupled between first node 334 and circuit ground 60. The capacitance of capacitor 332 and the resistance of resistor 336 are chosen such that a disturbance with a specified time-rate-of-change in voltage will produce sufficient voltage across resistor 336 to turn on SCR 320. The resistance of resistor 336 and the capacitance of capacitor 332 (i.e., the "RC" time constant) governs the speed at which sufficient voltage will be developed to turn on SCR 320 in response to a specified disturbance. In this regard, for a given value of resistance for resistor 336, a smaller capacitance will result in SCR 320 turning on in response to disturbances with a faster rate-of-rise, while a smaller capacitance will result in SCR 320 turning on in response to disturbances with a slower rate-of-rise. Thus, one can adjust the sensitivity of the trigger circuit to respond to those disturbances having a time-rate-of-change that exceeds a specified quantity. However, too small a capacitance will deprive resistor 336 of the current needed to develop sufficient voltage to activate SCR 320 following occurrence of a disturbance, and too large a capacitance will result in SCR 320 being turned on preemptively (i.e., even though a specified disturbance has not occurred). In a prototype ballast, capacitor 332 was set at 220 picofarads, resistor 336 was set at 330 ohms, and current-sensing resistor 240 was set at 3.3 ohms.

Preferably, protection circuit 300 further comprises a resistor 340 coupled between protection circuit output 304 and anode 322 of SCR 320. Resistor 340 functions as a current-limiting resistor for limiting the potentially high peak current that would otherwise flow through SCR 320 following turn on. The potentially high peak current is attributable to the fact that capacitor 136 acts as a low impedance source capable of supplying large amounts of current for a very limited period of time. In a prototype ballast, resistor 340 was set at 10 ohms.

The detailed operation of ballast 10 and protection circuit 300 is now explained with reference to FIG. 3 as follows.

When power is initially applied to ballast 10, drive circuit 130 is off. Capacitor 136 begins to charge up via resistor 134. Once the voltage across capacitor 136 reaches a minimum value (e.g., 9 volts) necessary to activate drive circuit 130, drive circuit 130 turns on and begins to commutate inverter transistors 110,120. With inverter switching now taking place, output circuit 200 becomes energized and soon develops sufficient voltage to ignite the lamp(s) in lamp load 30. Energy from output circuit 200 is used to bootstrap the inverter via capacitor 140 and diode 144, and the voltage across capacitor 136 and at DC supply input 132 quickly reaches its steady-state operating value (e.g., 15 volts).

With ballast 10 and lamp load 30 operating in a normal manner, the voltage across current-sensing resistor 240 is a substantially sinusoidal waveform having a frequency identical to the operating frequency of inverter 100. During this time, the current through capacitor 332 and the voltage across resistor 336 will be very low (e.g., approximately zero). Consequently, SCR 320 will remain off, and the voltage across capacitor 136 and at DC supply input 132 will remain at its normal steady-state operating value of approximately 15 volts.

If an output arc or other type of disturbance occurs, the voltage across current-sensing resistor 240 will include one or more transient spikes having a large time-rate-of-change (i.e., a large dV/dt). The large time-rate-of-change of the transient spike(s) will rapidly cause a substantial current to flow through capacitor 332 and resistor 336. Consequently, the voltage across resistor 336 will become large enough (e.g., 1 volt or greater) to turn on SCR 320. Once activated, SCR 320 couples DC supply input 132 to circuit ground 60 via resistor 340, causing the voltage across capacitor 136 to fall rapidly. Once the voltage across capacitor 136 falls below a level (e.g., 8 volts) necessary to maintain operation of drive circuit 130, drive circuit 130 will turn off and inverter switching will cease, thus terminating the disturbance. In this way, protection circuit 300 rapidly detects a disturbance and quickly disables inverter 100 so as to prevent any damage or undue stress to the ballast.

Once activated, and even after inverter 100 has been deactivated, SCR 320 will remain on and continue to discharge capacitor 136 as long as the voltage across capacitor 136 remains high enough to supply at least the minimum holding current (e.g., 10 milliamperes) required to maintain conduction through SCR 320. As the voltage across capacitor 136 approaches zero, the current through SCR 320 falls below the minimum holding current and SCR turns off. At this point, the inverter startup sequence described above will be repeated and the inverter will once again begin to operate.

In this way, following a disturbance, protection circuit 300 quickly turns inverter 100 off for a limited period of time sufficient to extinguish the disturbance and protect the ballast, but then allows inverter 100 to automatically restart.

Figure 4:
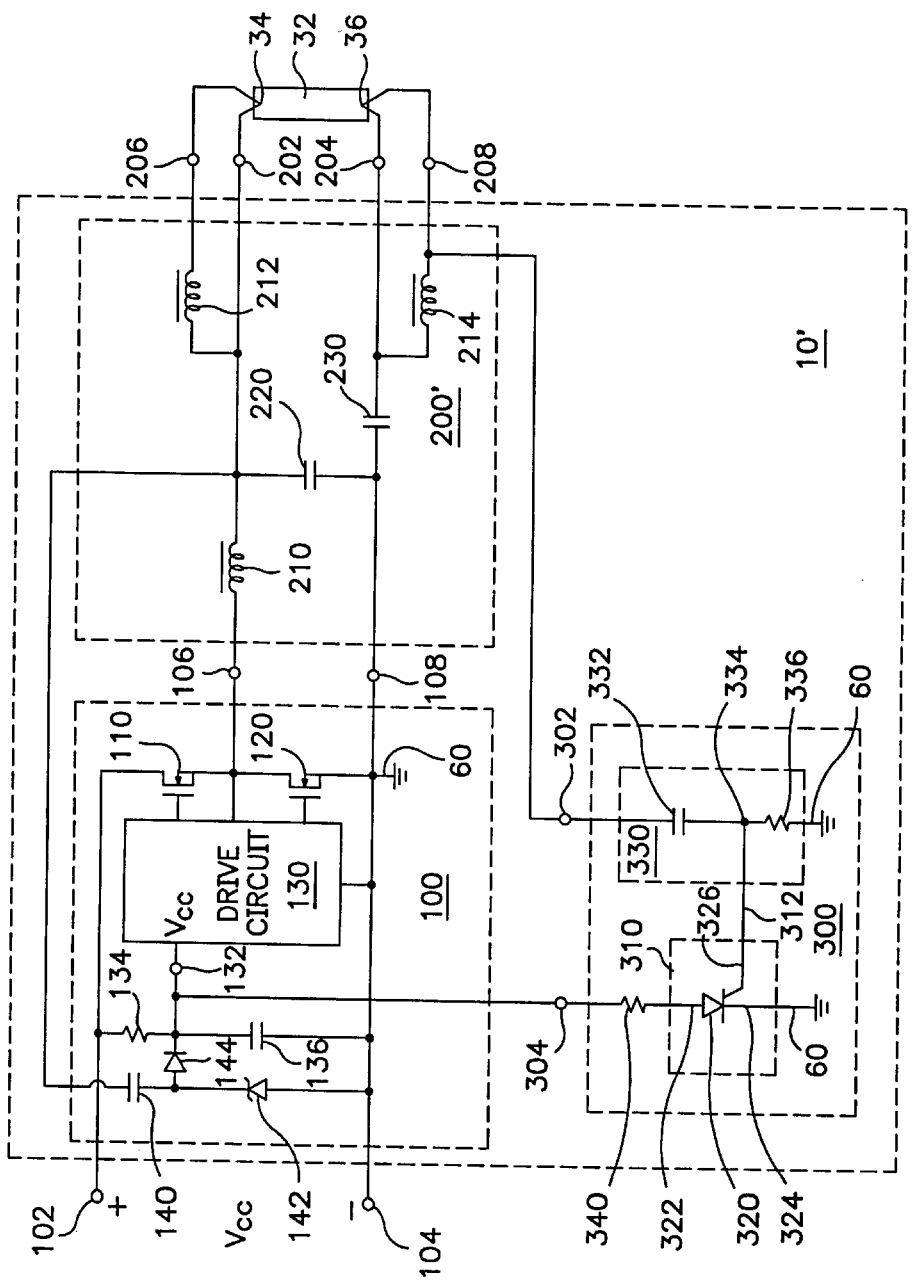
FIG. 4 is a schematic diagram of a ballast with a driven inverter and a series resonant output circuit, wherein a disturbance is monitored at an output connection of the ballast, in accordance with the second preferred embodiment of the present invention.

FIG. 4 describes a second preferred embodiment of the present invention, wherein the output circuit is modified to provide a ballast 10' that supplies filament heating to a lamp 32 having a first filament 34 and a second filament 36. Output circuit 200' includes all of the components previously recited with regard to output circuit 200 in FIG. 3, except for current-sensing resistor 240, and further comprises a third output connection 206, a fourth output connection 208, a first auxiliary winding 212, and a second auxiliary winding 214. First auxiliary winding 212 and second auxiliary winding 214 are magnetically coupled to resonant inductor 210. First filament 34 and first auxiliary winding 212 are coupled to first output connection 202 and third output connection 206. Second filament 36 and second auxiliary winding 214 are coupled to second output connection 204 and fourth output connection 208.

As described in FIG. 4, protection circuit input 302 is coupled to the fourth output connection (compare with the arrangement of FIG. 3, where protection circuit input 302 is coupled to current-sensing resistor 240 in series with resonant capacitor 220). In response to a disturbance, such as an arcing condition, the voltage existing between fourth output connection 208 and circuit ground 60 will include one or more transient spikes having a time-rate-of-change that substantially exceeds the time-rate-of-change during normal operation of the ballast and lamp.

The preferred structure and detailed operation of protection circuit 300 in the embodiment described in FIG. 4 is substantially the same as that which was previously discussed with regard to the embodiment described in FIG. 3.

Whereas the embodiments previously described with reference to FIGS. 3 and 4 are suitable for ballasts with driven inverters, FIGS. 5 and 6 describe a third preferred embodiment of the present invention that is suitable for ballasts that include a self-oscillating inverter.

Figure 5:
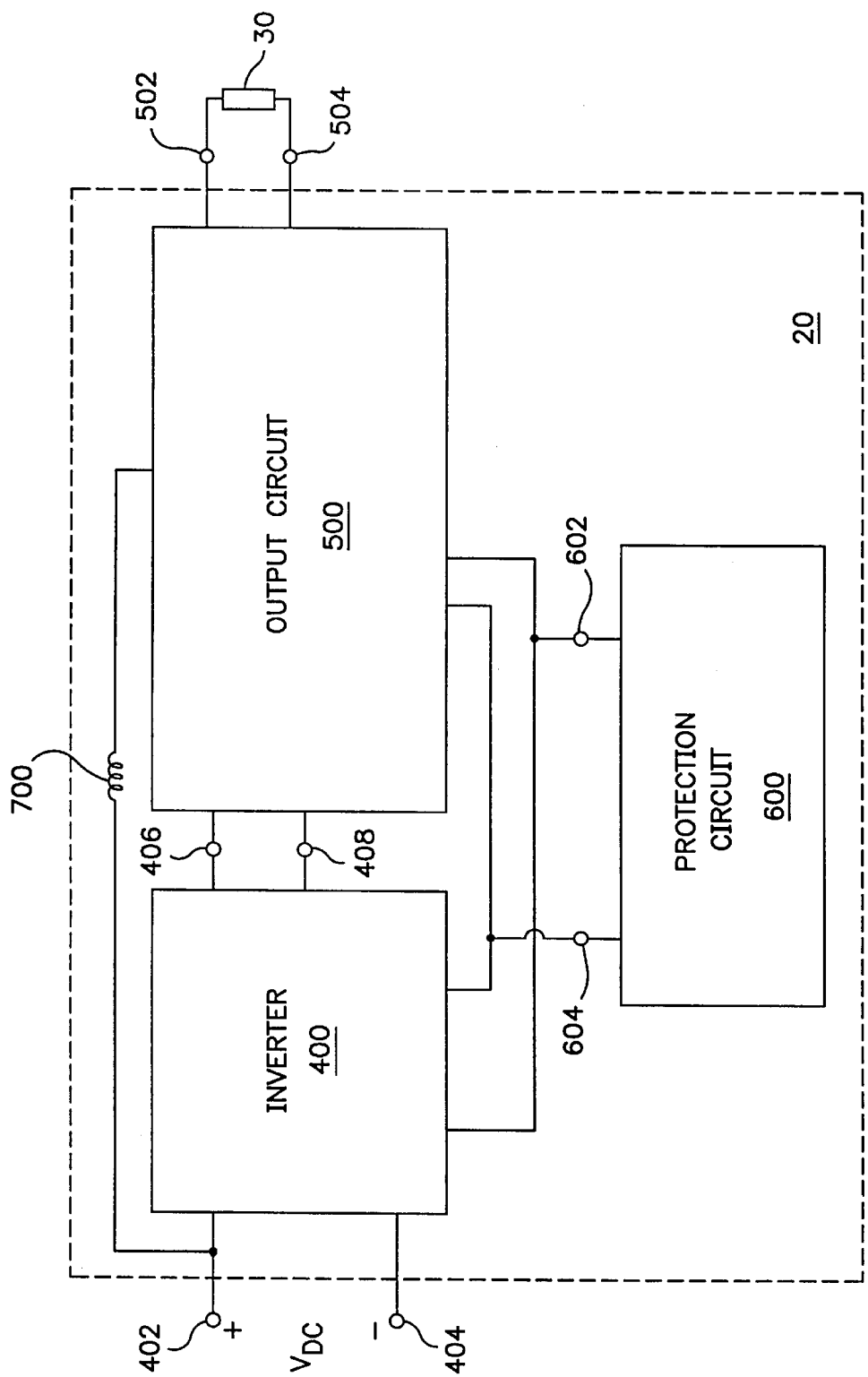
FIG. 5 is a block diagram schematic of a ballast with a protection circuit, in accordance with a third preferred embodiment of the present invention.

Referring to FIG. 5, ballast 20 comprises an inverter 400, an output circuit 500, a protection circuit 600, and a current-feed inductor 700. Inverter 400 has input terminals 402,404 and output terminals 406,408. During operation, inverter 400 receives a substantially direct current (DC) voltage, VDC, at input terminals 402,404, and provides a high frequency (e.g., 20 kilohertz or greater) voltage between inverter output terminals 406,408. Output circuit 500 is coupled to inverter output terminals 406,408, and includes output connections 502,504 for connection to gas discharge lamp load 30.

Figure 6:
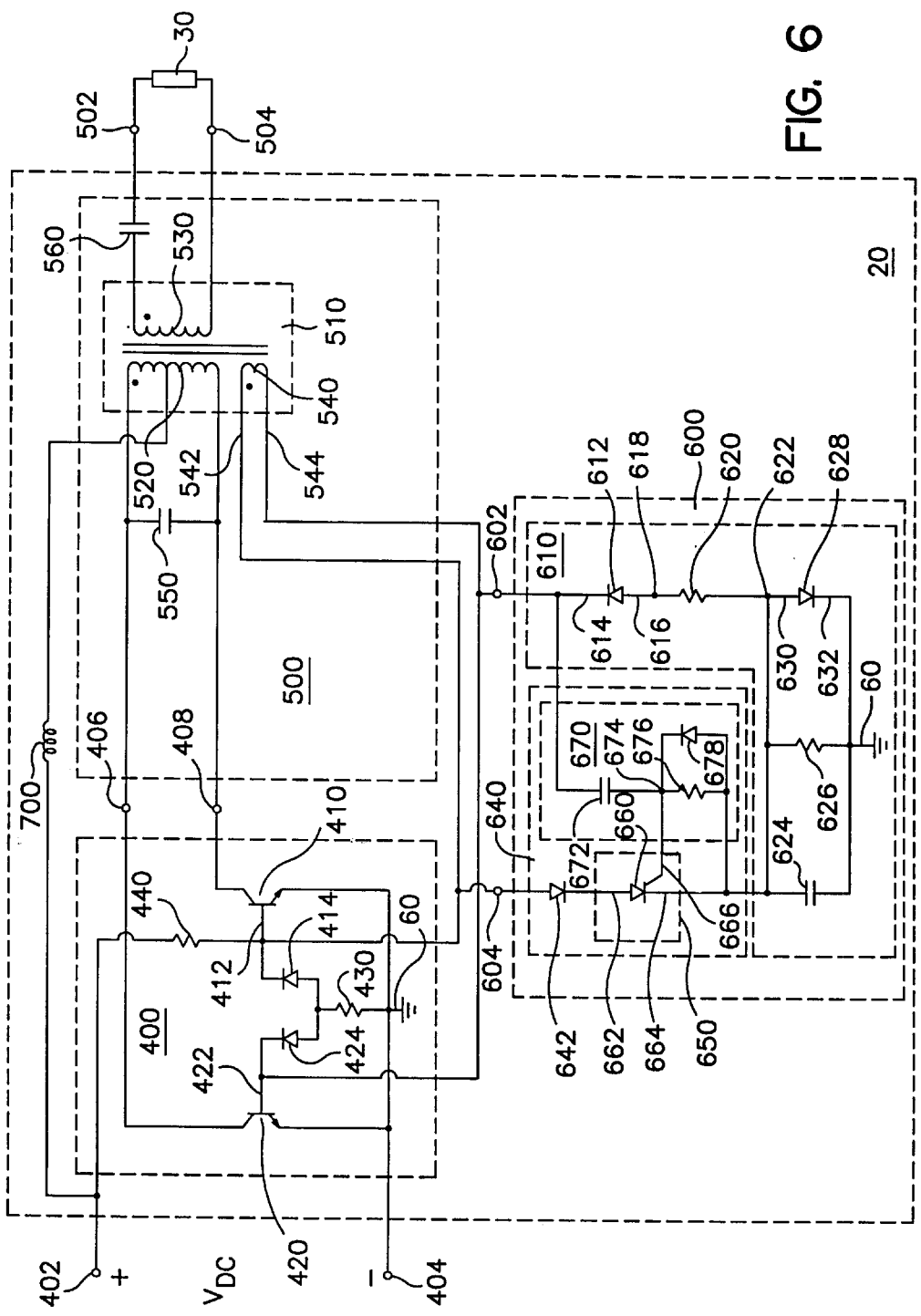
FIG. 6 is a schematic diagram of a ballast with a self-oscillating inverter, in accordance with a third preferred embodiment of the present invention.

Turning to FIG. 6, output circuit 500 includes a resonant capacitor 550 and an output transformer 510. Resonant capacitor 550 is coupled between inverter output terminals 406,408. Output transformer 510 includes a primary winding 520, a secondary winding 530, and an auxiliary winding 540. Primary winding 520 is coupled between inverter output terminals 406,408. Secondary winding 530 is coupled to output connections 502,504. Auxiliary winding 540 is coupled to inverter 400, and includes a first end 542 and a second end 544. As will be discussed further below, auxiliary winding 540 provides base drive for operating inverter 400. Output circuit 500 further includes a ballasting capacitor 560 that limits the operating current provided to lamp load 30.

Protection circuit 600 is coupled to inverter 400 and auxiliary winding 540 of output transformer 510 During operation, protection circuit 600 monitors a voltage signal (e.g., the voltage across auxiliary winding 540) associated with output transformer 510. In response to occurrence of a disturbance in the voltage signal, protection circuit 600 disables inverter 400 for a predetermined period of time. A disturbance is deemed to have occurred when at least a portion of the voltage signal has a time-rate-of-change (i.e., dV/dt) that substantially exceeds the time-rate-of-change of the signal during normal operation of the ballast and lamp load 30.

Advantageously, following a disturbance in the voltage signal, protection circuit 600 is capable of disabling inverter 400 within a response time that is less than twice the period of the high frequency voltage between inverter output terminals 406,408. For typical ballast applications, where the frequency of the voltage at the inverter output is designed to be 20 kilohertz or greater, this corresponds to a response time that is less than 100 microseconds.

Preferably, inverter 400 and protection circuit 600 are further operable such that inverter 400 is re-enabled after the predetermined period of time (e.g., 100 milliseconds) elapses. This feature is desirable in order to prevent permanent shutdown of the ballast (i.e, necessitating that power to the ballast be cycled off and on in order to reset the ballast) in the event of false detection due to a momentary power line transient or any of a number of anomalous phenomena that pose no sustained threat to ballast reliability or safety.

As described in FIG. 6, protection circuit 600 includes a first input 604 coupled to the first end 542 of auxiliary winding 540, and a second input 602 coupled to the second end 544 of auxiliary winding 540. Inverter 400 includes a pair of inverter switches 410,420 connected in a push-pull configuration. Each inverter switch 410,420 has a control input 412,422 for receiving a control voltage that turns the switch on and off Auxiliary winding 540 is coupled to inverter switches 410,420 and provides the control voltage. Resistor 430, resistor 440, diode 414, and diode 424 operate in conjunction with auxiliary winding 540 to effect switching of inverter switches 410,420. During normal operation of the ballast and lamp load, auxiliary winding 540 has a substantially sinusoidal voltage that turns the inverter switches on and off in a substantially complementary manner. In response to a disturbance, protection circuit 600 disables inverter 400 by forcing the control voltage of at least one of the inverter switches to a negative value, and then keeping the control voltage negative, for a predetermined period of time.

Preferably, protection circuit 600 comprises a pull-down circuit 640 and a negative voltage source 610. Pull-down circuit 640 is coupled to first input 604, second input 602, and negative voltage source 610. In response to a disturbance, pull-down circuit 640 couples first input 604 to negative voltage source 620 for a limited period of time Negative voltage source 610 is coupled between second input 602 and circuit ground 60.

Pull-down circuit 640 includes a latching device 650 and a triggering circuit 670. Latching device 650, which is preferably realized as a silicon-controlled rectifier (SCR) 660, is coupled between first input 604 and negative voltage source 610, and includes an anode 662, a cathode 664, and a gate 666. During operation, in response to a voltage between gate 666 and cathode 664 reaching a predetermined triggering voltage, SCR 660 turns on and couples anode 662 to cathode 664. Once turned on, SCR 660 remains on for as long as the amount of current flowing from anode 62 to cathode 664 exceeds a predetermined holding current (e.g., 10 milliamperes). Triggering circuit 670 is coupled to second input 602, gate 666, and cathode 664. In response to a disturbance in the voltage across auxiliary winding 540, triggering circuit 670 provides sufficient voltage between gate 666 and cathode 664 to quickly turn on SCR 660. Triggering circuit 670 includes a capacitor 672 and a resistor 676. Capacitor 672 is coupled between second input 602 and a first node 674. Resistor 676 is coupled between first node 674 and cathode 664 of SCR 660. In a prototype ballast, capacitor 672 was set at 100 picofarads and resistor 676 was set at 1 kilohm.

Triggering circuit 670 optionally includes a diode 678 placed in parallel with resistor 676. Diode 678 prevents large negative gate-to-cathode voltages from being applied to SCR 660, and thus protects SCR 660 from potential damage.

Pull-down circuit 640 optionally includes a diode 642 coupled between first input 604 and anode 662 of SCR 660. It is believed that diode 642 serves to prevent self-triggering of SCR 660 under normal high-frequency conditions that occur in ballast 20.

As described in FIG. 6, negative voltage source 610 includes a first diode 612, a first resistor 620, a capacitor 624, a second resistor 626, and a second diode 628. First diode 612 has a cathode 614 coupled to second input 602 and an anode 616 coupled to a second node 618. First resistor 620 is coupled between second node 618 and a third node 622. Capacitor 624 and second resistor 626 are each coupled between third node 622 and circuit ground 60. Second diode 628 has an anode 630 coupled to third node 6223 and a cathode 632 coupled to circuit ground 60.

The detailed operation of ballast 20 and protection circuit 600 is now explained with reference to FIG. 6 as follows.

When power is initially applied to ballast 20, a small amount of energy is provided to the base of transistor 410 via resistor 440, and causes transistor 410 to turn on. This energizes output circuit 500 and an alternating voltage develops across auxiliary winding 540. As the voltage across auxiliary winding 540 alternates, transistors 410 and 420 are turned on and off in a substantially complementary manner. Output circuit 500 soon develops sufficient voltage to ignite the lamp(s) in lamp load 30.

With ballast 20 and lamp load 30 operating in a normal manner, the voltage across auxiliary winding 540 is a substantially sinusoidal waveform having a frequency identical to the operating frequency of inverter 400 and varying between about +12 volts and −12 volts. During this time, pull-down circuit 640 is inactive and remains so until such time as a disturbance is detected in the voltage across auxiliary winding 540. Negative voltage source 610 uses the negative half-cycles of the voltage across auxiliary winding 540 to develop a voltage of approximately −3 volts across capacitor 624. The resistances of resistor 620 and resistor 626 determine the value of the negative voltage across capacitor 624 In a prototype ballast, resistors 620,626 were each set at 470 ohms.

If an output arc or other type of disturbance occurs, the voltage across auxiliary winding 540 will include one or more transient spikes having a large time-rate-of-change. The large time-rate-of-change of the transient spike(s) will rapidly cause a substantial current to flow through capacitor 672 and resistor 676. Consequently, the voltage across resistor 676 will become large enough (e.g., 1 volt or greater) to turn on SCR 660. Once activated, SCR 660 couples the base 412 of transistor 410 to a negative voltage (e.g., −2 volts at the moment that SCR 660 is first turned on), and thus terminates oscillation in inverter 400 for at least a limited period of time. In this way, protection circuit 600 rapidly detects a disturbance and quickly disables inverter 400 so as to prevent any damage or undue stress to the ballast.

Once activated, and even after inverter 400 has been disabled, SCR 660 will remain on (due to holding current supplied via resistor 430 and diode 414) and prevent the inverter from restarting as long as the voltage across capacitor 624 remains sufficiently negative to maintain a current through SCR 660 that is greater than the minimum holding current of the device (e.g., 10 milliamperes). As the voltage across capacitor 624 becomes less and less negative, the current flowing through SCR 660 decreases. Once the current flowing through SCR 660 falls below the minimum holding current, SCR 660 turns off (because it is desirable to ensure that the inverter remains off for at least 100 milliseconds or so following occurrence of a fault, and the capacitance of capacitor 624 at least partially governs how long SCR 660 will remain on, it is recommended that capacitor 624 be set at a large value such as 1000 microfarads). At this point, the inverter startup sequence described above will be repeated and the inverter will once again begin to operate In this way, following a disturbance, protection circuit 600 quickly turns inverter 400 off for a limited period of time sufficient to extinguish the disturbance and protect the ballast, but then allows inverter 400 to automatically restart.

Although the present invention has been described with reference to certain preferred embodiments, numerous modifications and variations can be made by those skilled in the art without departing from the novel spirit and scope of this invention.

What is claimed is:

1. A ballast for powering a gas discharge lamp load, the ballast comprising a protection circuit operable to:
   (i) monitor an electrical signal within the ballast; and
   (ii) disable the ballast for at least a predetermined period of time in response to a disturbance wherein at least a portion of the electrical signal exhibits a time-rate-of-change that substantially exceeds the time-rate-of-change of the signal during normal operation of the ballast and gas discharge lamp load, wherein the protection circuit is further operable to disable the ballast within less than 100 microseconds after occurrence of the disturbance.

2. The ballast of claim 1, wherein the protection circuit is operable to disable the ballast in response to at least one of:
   disconnection of a lamp from the ballast; and
   an arcing condition at an output of the ballast.

3. The ballast of claim 1, wherein:
   during normal operation of the ballast and gas discharge lamp load, the electrical signal is a periodic signal having a period; and
   the protection circuit is operable to disable the ballast within a response time that is less than twice the period of the electrical signal.

4. The ballast of claim 1, wherein the ballast and protection circuit are further operable such that the ballast is reenabled after the predetermined period of time elapses.

5. The ballast of claim 1, wherein the predetermined period of time is less than one second.

6. A ballast for powering a gas discharge lamp load, comprising:
   an inverter operable to provide a high frequency voltage at an inverter output;
   an output circuit coupled to the inverter output and having output connections adapted for connection to the gas discharge lamp load;
   a protection circuit coupled to the inverter and the output circuit, wherein the protection circuit is operable to:
   (i) monitor a signal within the output circuit; and
   (ii) disable the inverter for at least a predetermined period of time in response to a disturbance wherein at least a portion of the signal exhibits a time-rate-of-change that substantially exceeds the time-rate-of-change of the signal during normal operation of the ballast and gas discharge lamp load, wherein:
      during normal operation of the ballast and gas discharge lamp load, the high frequency voltage at the inverter output is a substantially periodic signal having a period; and
      the protection circuit is operable, in response to a disturbance in the signal within the output circuit, to disable the inverter within a response time that is less than at least one of:
         twice the period of the high frequency voltage at the inverter output; and
         100 microseconds.

7. The ballast of claim 6, wherein the inverter and protection circuit are operable such that the inverter is reenabled after the predetermined period of time elapses.

8. The ballast of claim 6, wherein the predetermined period of time is less than one second.

9. An electronic ballast, comprising:
   an inverter having first and second output terminals, the second output terminal being coupled to circuit ground, the inverter being operable to provide a high frequency voltage between the first and second output terminals;
   an output circuit coupled to the output terminals of the inverter, the output circuit comprising:
      first and second output connections adapted for connection to a lamp load comprising at least one gas discharge lamp;
      a resonant inductor coupled between the first output terminal of the inverter and the first output connection;
      a resonant capacitor coupled between the first output connection and circuit ground; and
      a direct current blocking capacitor coupled between the second output connection and circuit ground;
   a protection circuit having an input coupled to the output circuit, and an output coupled to the inverter, the protection circuit being operable to monitor a signal within the output circuit and, in response to occurrence of a disturbance in the signal, to disable the inverter for a predetermined period of time, wherein a disturbance is deemed to have occurred when at least a portion of the signal has a time-rate-of-change that substantially exceeds the time-rate-of-change of the signal during normal operation of the ballast and lamp load, wherein the protection circuit further comprises:
      a latching device coupled between the output of the protection circuit and circuit ground, the latching device having a control terminal and being operable to:
         (i) turn on and couple the output of the protection circuit to circuit ground in response to a voltage at the control terminal reaching a predetermined triggering voltage; and
         (ii) remain on for as long as the amount of current flowing through the latching device from the output of the detection circuit to circuit ground exceeds a predetermined holding current; and
      a triggering circuit coupled to the input of the protection circuit, the control terminal of the latching device, and circuit ground, the triggering circuit being operable, in response to a disturbance, to provide sufficient voltage at the control terminal to turn on the latching device.

10. The ballast of claim 9, wherein:
the output circuit further comprises a current-sensing resistor interposed between the resonant capacitor and the circuit ground node; and
the input of the protection circuit is coupled to the current-sensing resistor.

11. The ballast of claim 9, wherein:
the inverter further comprises a pair of inverter switches and a drive circuit coupled to the pair of inverter switches, the drive circuit having a supply input for receiving a direct current (DC) supply voltage, the drive circuit being operable to switch the inverter switches on and off in a substantially complementary manner as long as the DC supply voltage is greater than a predetermined value;
the output of the protection circuit is coupled to the supply input of the drive circuit; and
the protection circuit is operable, in response to a disturbance, to turn the drive circuit off by coupling the supply input of the drive circuit to the circuit ground node for a limited period of time.

12. The ballast of claim 9, wherein:
during normal operation of the ballast and gas discharge lamp load, the high frequency voltage at the inverter output is a substantially periodic signal having a period; and
the triggering circuit is operable, in response to a disturbance, to provide sufficient voltage at the control terminal to turn on the latching device within a response time that is less than at least one of:
twice the period of the high frequency voltage at the inverter output; and
100 microseconds.

13. The ballast of claim 9, wherein the latching device is a silicon-controlled rectifier having an anode coupled to the protection circuit output, a cathode coupled to circuit ground, and a gate terminal, wherein the gate terminal is the control terminal.

14. The ballast of claim 13, wherein the triggering circuit comprises:
a capacitor coupled between the input of the protection circuit and a first node, wherein the first node is coupled to the control terminal of the latching device; and
a resistor coupled between the first node and circuit ground.

15. The ballast of claim 9, wherein the output circuit further comprises:
third and fourth output connections adapted for connection to the at least one gas discharge lamp, wherein the lamp includes:
a first filament coupled to the first and third output connections; and
a second filament coupled to the second and fourth output connections; and
first and second auxiliary windings magnetically coupled to the resonant inductor, wherein:
the first auxiliary winding is coupled between the first and third output connections; and
the second auxiliary winding is coupled between the second and fourth output connections.

16. The ballast of claim 15, wherein the input of the protection circuit is coupled to the fourth output connection.

17. The ballast of claim 15, wherein:
the inverter further comprises a pair of inverter switches and a drive circuit coupled to the pair of inverter switches, the drive circuit having a supply input for receiving a direct current (DC) supply voltage, the drive circuit being operable to switch the inverter switches on and off in a substantially complementary manner as long as the DC supply voltage is greater than a predetermined value;
the output of the protection circuit is coupled to the supply input of the drive circuit; and
the protection circuit is operable, in response to a disturbance, to turn the drive circuit off by coupling the supply input of the drive circuit to circuit ground for a limited period of time.

18. A ballast for powering at least one gas discharge lamp, comprising:
an inverter having a pair of output terminals and operable to provide a high frequency voltage between the inverter output terminals;
an output circuit coupled to the output terminals of the inverter, the output circuit comprising:
output connections adapted for connection to the at least one gas discharge lamp;
a resonant capacitor coupled between the inverter output terminals; and
an output transformer, comprising:
a primary winding coupled between the inverter output terminals;
a secondary winding coupled to the output connections; and
an auxiliary winding coupled to the inverter, the auxiliary winding having a first end and a second end; and
a protection circuit coupled to the inverter and the auxiliary winding of the output transformer, the protection circuit being operable to monitor a voltage signal associated with the output transformer and, in response to occurrence of a disturbance in the voltage signal, to disable the inverter for a predetermined period of time, wherein a disturbance is deemed to have occurred when at least a portion of the voltage signal has a time-rate-of-change that substantially exceeds the time-rate-of-change of the signal during normal operation of the ballast and lamps, wherein the protection circuit includes:
a first input coupled to the first end of the auxiliary winding; and
a second input coupled to the second end of the auxiliary winding.

19. The ballast of claim 18, wherein:
during normal operation of the ballast and gas discharge lamp, the high frequency voltage at the inverter output is a substantially periodic signal having a period; and
the protection circuit is operable, in response to a disturbance in the voltage signal, to disable the inverter within a response time that is less than at least one of:
twice the period of the high frequency voltage between the inverter output terminals; and
100 microseconds.

20. The ballast of claim 18, wherein the inverter and protection circuit are operable such that the inverter is reenabled after the predetermined period of time elapses.

21. The ballast of claim 18, wherein the predetermined period of time is less than one second.

22. The ballast of claim 18, wherein:

the inverter further comprises a pair of inverter switches, each inverter switch having a control input for receiving a control voltage that turns the switch on and off;

the auxiliary winding is coupled to the inverter switches and operable to provide the control voltage;

during normal operation of the ballast and lamp load, the auxiliary winding has a substantially sinusoidal voltage, thereby providing control voltages for switching the inverter switches on and off in a substantially complementary manner; and the protection circuit is operable, in response to a disturbance, to disable the inverter by forcing the control voltage of at least one of the inverter switches to a negative value, and to maintain the control voltage at a negative value, for a limited period of time.

23. The ballast of claim 22, wherein the inverter is a push-pull type inverter.

24. The ballast of claim 22, wherein the protection circuit further comprises:

a negative voltage source coupled between the second input and circuit ground;

a pull-down circuit coupled to the first and second inputs and the negative voltage source, wherein the pull-down circuit is operable, in response to a disturbance, to couple the first input to the negative voltage source for a limited period of time.

25. The ballast of claim 24, wherein the pull-down circuit comprises:

a latching device coupled between the first input and the negative voltage source, the latching device having an anode, a cathode, and a gate, and being operable to:
  (i) turn on and couple the anode to the cathode in response to a voltage between the gate and the cathode reaching a predetermined triggering voltage; and
  (ii) remain on for as long as the amount of current flowing through the latching device from the anode to the cathode exceeds a predetermined holding current; and a triggering circuit coupled to the second input, the gate, and the cathode, the triggering circuit being operable, in response to a disturbance, to provide sufficient voltage between the gate and the cathode to turn on the latching device.

26. The ballast of claim 25, wherein:

during normal operation of the ballast and lamp, the high frequency voltage at the inverter output is a substantially periodic signal having a period; and the triggering circuit is operable, in response to a disturbance, to provide sufficient voltage between the gate and the cathode to turn on the latching device within a response time that is less than at least one of:
  twice the period of the high frequency voltage at the inverter output; and
  100 microseconds.

27. The ballast of claim 25, wherein the pull-down circuit further comprises a diode coupled between the first input and the anode of the latching device.

28. The ballast of claim 25, wherein the triggering circuit comprises:

a capacitor coupled between the second input and a first node; and a resistor coupled between the first node and the cathode of the latching device.

29. The ballast of claim 25, wherein the negative voltage source comprises:

a first diode having a cathode coupled to the second input and an anode coupled to a second node;

a first resistor coupled between the second node and a third node;

a capacitor coupled between the third node and circuit ground, a second diode having an anode coupled to the third node, and a cathode coupled to circuit ground; and a second resistor coupled between the third node and circuit ground.

* * * * *